US012643779B2

(12) United States Patent
Seagraves et al.

(10) Patent No.: US 12,643,779 B2
(45) Date of Patent: Jun. 2, 2026

(54) EXTENDED SWING FRAME ROLL CLAMP

(71) Applicant: Cascade Corporation, Fairview, OR (US)

(72) Inventors: Angela Corrine Seagraves, Portland, OR (US); Anthony Michael Logsdon, Vancouver, WA (US); Cory Evan Pearman, Oregon City, OR (US)

(73) Assignee: Cascade Corporation, Fairview, OR (US)

( * ) Notice: Subject to any disclaimer, the term of this patent is extended or adjusted under 35 U.S.C. 154(b) by 367 days.

(21) Appl. No.: 18/371,742

(22) Filed: Sep. 22, 2023

(65) Prior Publication Data

US 2024/0101402 A1 Mar. 28, 2024

Related U.S. Application Data

(60) Provisional application No. 63/376,731, filed on Sep. 22, 2022.

(51) Int. Cl.
*B66F 9/18* (2006.01)
*B66F 9/16* (2006.01)

(52) U.S. Cl.
CPC ................ *B66F 9/184* (2013.01); *B66F 9/16* (2013.01)

(58) Field of Classification Search
CPC .................................. B66F 9/184; B66F 9/16
See application file for complete search history.

(56) References Cited

U.S. PATENT DOCUMENTS 2,666,541 A * 1/1954 Ferrario .................. B66F 9/184 294/197
3,363,929 A 1/1968 Nelson
3,896,957 A * 7/1975 Sinclair .................. B66F 9/184 414/640
4,051,966 A * 10/1977 Cotton .................. B66F 9/183 294/902
4,127,205 A * 11/1978 Farmer .................. B66F 9/184 294/206
4,227,850 A * 10/1980 Farmer .................. B66F 9/184 92/52
4,435,119 A * 3/1984 House .................. B66F 9/184 414/642
5,536,133 A * 7/1996 Velez .................. B66F 9/184 294/86.41
5,984,617 A 11/1999 Seaberg
9,067,771 B2 * 6/2015 Running .................. B66F 9/184
2014/0138502 A1 5/2014 Hall

FOREIGN PATENT DOCUMENTS

EP 0385242 A2 9/1990
JP 3947630 B2 7/2007
WO 2014204496 A1 12/2014

OTHER PUBLICATIONS

U.S. Receiving Office, International Search Report and Written Opinion for PCT Application No. PCT/US2023/033498, dated Dec. 19, 2023, 9 pages.

* cited by examiner

*Primary Examiner* — Mark C Hageman
(74) *Attorney, Agent, or Firm* — Chernoff, Vilhauer LLP

(57) ABSTRACT

A swing frame roll clamp may include a mounting plate mountable to a lift truck and a pair of opposed clamp arms. The clamp arms may be configured to selectively and alternately grasp and release a cylindrical load, and each opposed clamp arm may be capable of becoming either a short arm or a long arm relative to the other opposed clamp arm.

15 Claims, 9 Drawing Sheets

EXTENDED SWING FRAME ROLL CLAMP

CROSS-REFERENCE TO RELATED APPLICATIONS

This application claims the benefit of U.S. Provisional Patent Application No. 63/376,731 filed Sep. 22, 2022.

BACKGROUND

The present disclosure relates to a roll clamp and, more particularly, to a swing frame roll clamping apparatus mountable on a vehicle for engaging, transporting and stacking rolls of paper and other materials.

Pivoting arm roll clamps, made to mount on lift trucks and other vehicles, are widely used in handling rolls of paper products, such as newsprint and kraft paper, as well as other materials. Pivoting arm roll clamps allow a paper roll or other cylindrical load to be grasped or released from either a long-arm/short-arm configuration or an equal-arm configuration. Typically, roll clamps are rotatable to engage, transport, and deposit a roll with the longitudinal axis of the roll either vertical or horizontal. If the roll is lying on a surface with the axis of the roll horizontal (called the “bilge position”), it is preferable that the long-arm/short-arm configuration be used where the arms at the top of the horizontally-oriented clamping attachment extend forward of the lift vehicle further than the lower arms, so that the upper arm can overreach the roll enabling the clamp pads at the ends of the upper and lower arms to engage the roll at diametrically opposed positions without requiring that the lower arm be pushed under the roll, which is likely to cause it to roll away from the clamp. On the other hand, when a roll is transported or stacked with the longitudinal axis vertical, it is often preferable that the equal-arm configuration be used where the arms on both sides of the roll extend equally far forward of the lift vehicle to facilitate inserting both arms between closely adjacent rolls without damaging them. However, even when grasping or releasing a roll in a vertical orientation, it is sometimes useful to use a long-arm/short-arm configuration if the roll is grasped from, or released to, a location abutting a wall or other surface.

Existing swing frame paper roll clamps, such as the paper roll clamp disclosed in House, U.S. Pat. No. 4,435,119, enable the clamp arms on opposing sides of the clamping attachment to be moved toward or away from the vehicle. A rotator is attached to a lift truck or other vehicle and a face plate of the swing frame clamp is attached to the rotator’s bearing on the side farthest from the lift vehicle. The face plate is a large monolithic plate including a number of holes for fasteners to secure the face plate to the rotator’s bearing and defining a large central aperture in which a revolving hydraulic connection is mounted. Upper and lower subframes, having generally I-beam cross-sections, are each pivotally attached to the face plate by pins that engage respective pairs of support blocks welded to, and projecting from, the face plate above and below each subframe. The clamp arms are pivotally attached to the subframes and are pivoted to clamp or release a load by hydraulic clamping rams which are, respectively, connected to a clamp arm and one of the subframes. Extension or retraction of a swing frame hydraulic ram attached to the face plate and the subframes pivots the subframes about their central connections to the faceplate to swing the opposing ends of the subframes and the attached clamp arms nearer or farther from the lift truck.

Hydraulic fluid from the lift truck flows through the revolving hydraulic connection at the center of the face plate and thence into conduits arrayed across the surface of the face plate to the various hydraulic rams of the clamp. The eight conduits that supply hydraulic fluid to the clamping rams are complex, each comprising a U-shaped tubing portion connected to a flexible hose portion. Each tube portion includes a first length of tubing extending away the central revolving hydraulic connection toward the side of the face plate opposite of the clamping ram to which the conduit will ultimately be connected. A second length of tubing extends normal to the first length toward either the top or the bottom of the face plate. A relief is provided in a portion the innermost flange of each subframe, on both sides of the central pivot, so that the second lengths of tubing can extend from the middle of the face plate to a point behind the web of the I-shaped subframe. A third length of tubing, bent normal to the second length, extends the conduit behind the web of the respective subframe toward the lateral center of the face plate where the tubing is attached to a hose which is connected to one of the clamping rams. The hose permits the conduits to conform to the movements of the clamping rams as they swing relative to the face plate when the clamp arms are pivoted. The relief in the subframe’s flange to accommodate the conduits supplying the clamping rams concentrates stress in the flange and the conduits are difficult to access for assembly or repair, such as replacing a worn hose portion, because they are attached to the face plate behind the subframes.

As noted earlier, swing frame roll clamp attachments mounted to a lift tuck or other vehicle are used to grasp and relocate roll-type products or other cylindrically-shaped loads, and such loads may be grasped from and deposited in different orientations, i.e. a vertical orientation where the roll stands on one of its two flat ends, or a horizontal (“bilge”) orientation where the roll rests on its curved surface. An operator of a vehicle oftentimes will not know whether a load is to be grasped from, or released in, an equal-arm or a long-arm/short-arm configuration until reaching the load or destination, respectively. Similarly, even where a long-arm/short-arm configuration is used, an operator will often not know which side of the vehicle to which the short arm should be positioned until reaching the load/destination. Frequently, rolls or other such cylindrical loads are stored in enclosed areas with very little maneuvering room for a vehicle to change the configuration of the clamp arms, making it difficult for an operator to properly position a load. What is desired, therefore, is an improved swing frame roll clamp that provides improved maneuverability

DETAILED DESCRIPTION OF PREFERRED EMBODIMENTS

Figure 1:
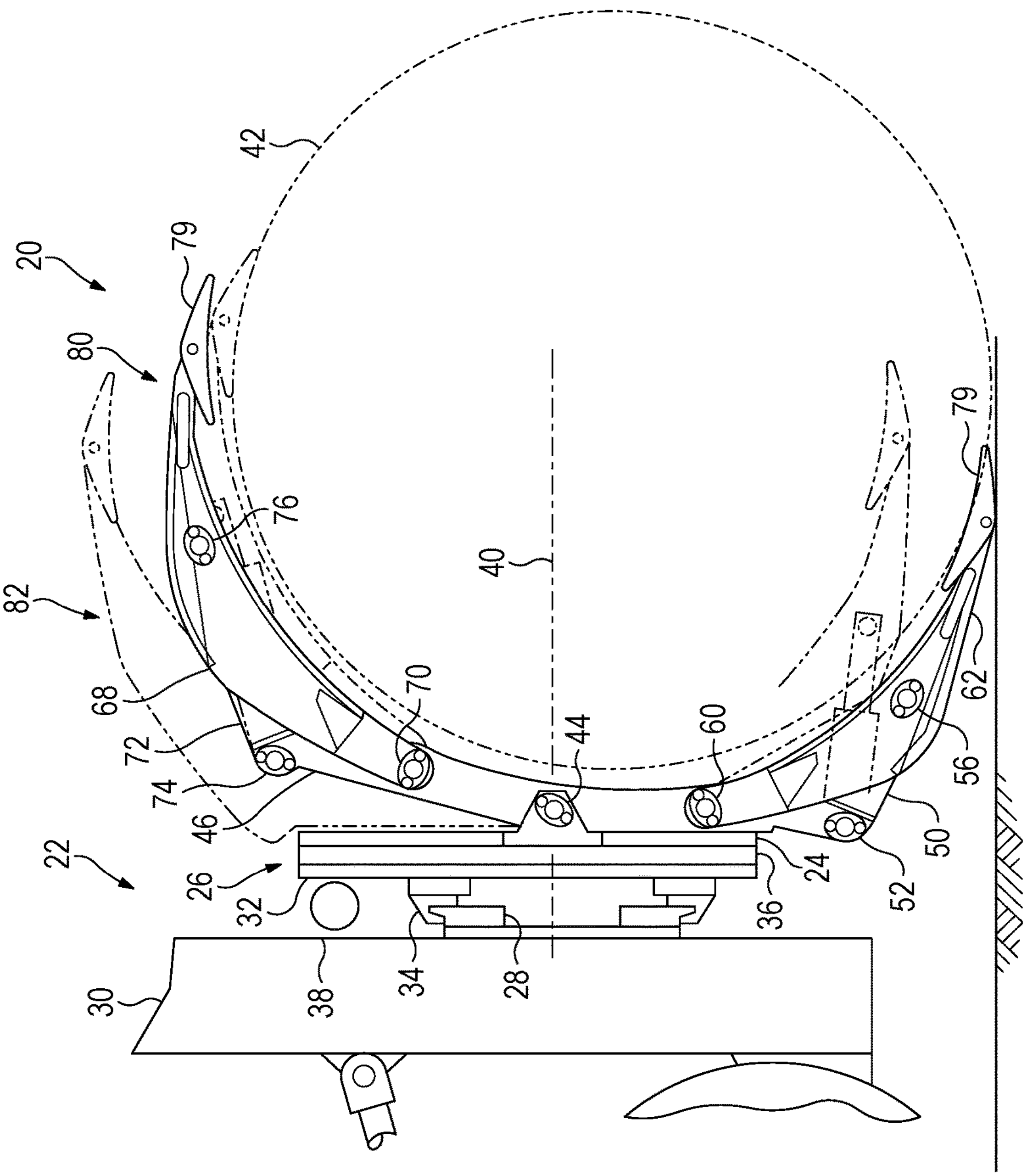
FIG. 1 shows a side elevation view of a swing frame roll clamp in the bilge position and a portion of a forklift truck.

Referring in detail to the drawings where similar parts are identified by like reference numerals, and, more particularly to FIG. 1, while the exemplary swing frame roll clamp designated generally as 20 is mountable on a forklift truck 22, the clamp could be attached to other types of vehicles. A face plate 24 of the roll clamp 20 is attached to rotator 26 which is, in turn, attached to a carriage 28 of the lift truck. The carriage is arranged to move upward and downward in the lift truck's mast 30 which can also be tilted fore and aft with respect the lift truck to change the angular relationship of the clamp and/or engaged roll with respect to the surface supporting the lift truck.

The rotator 26 comprises, generally, a baseplate 32 to which are attached hooks 34 which engage the carriage 28 of the forklift truck. The baseplate 32 is attached to an outer race of a bearing 36. Gear teeth formed on the interior of the inner race of the bearing 36 mesh with gear teeth on a pinion which is rotatable by a hydraulic motor 38. The rotator provides powered rotation of the roll clamp 20 about an axis of rotation 40 generally parallel to the longitudinal axis of the lift truck. Rotation of the clamp permits engagement and handling of cylindrical rolls 42 of paper or other material when the central axis of the roll is oriented horizontally, as illustrated in FIG. 1, for example, for loading a roll into a machine such as a printing press, or vertically for transport or stacking.

Figure 2:
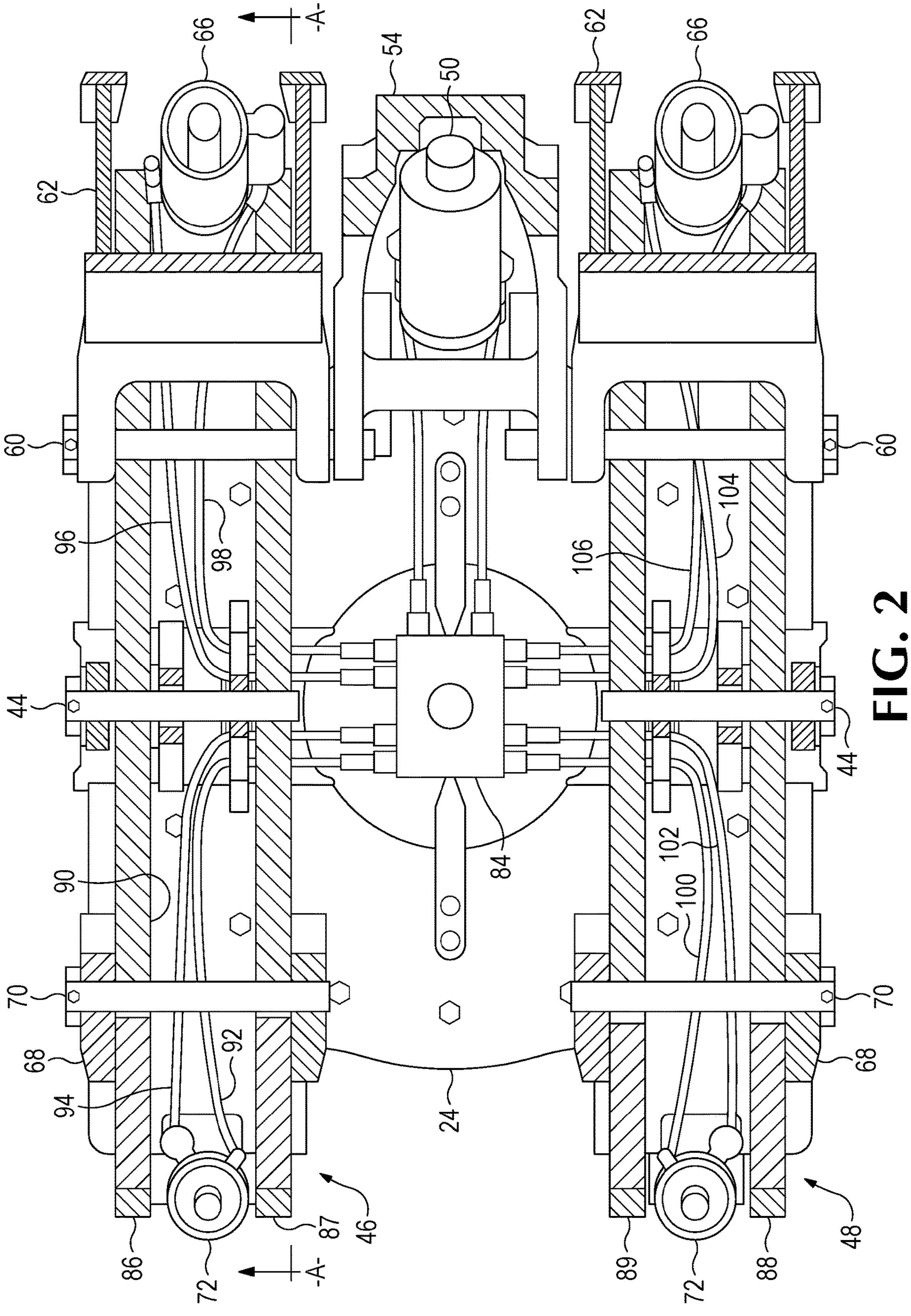
FIG. 2 shows a partial front view with portions removed to reveal the underlying structure of the swing frame roll clamp of FIG. 1 rotated to engage a roll with a vertically oriented central axis.
Figure 3:
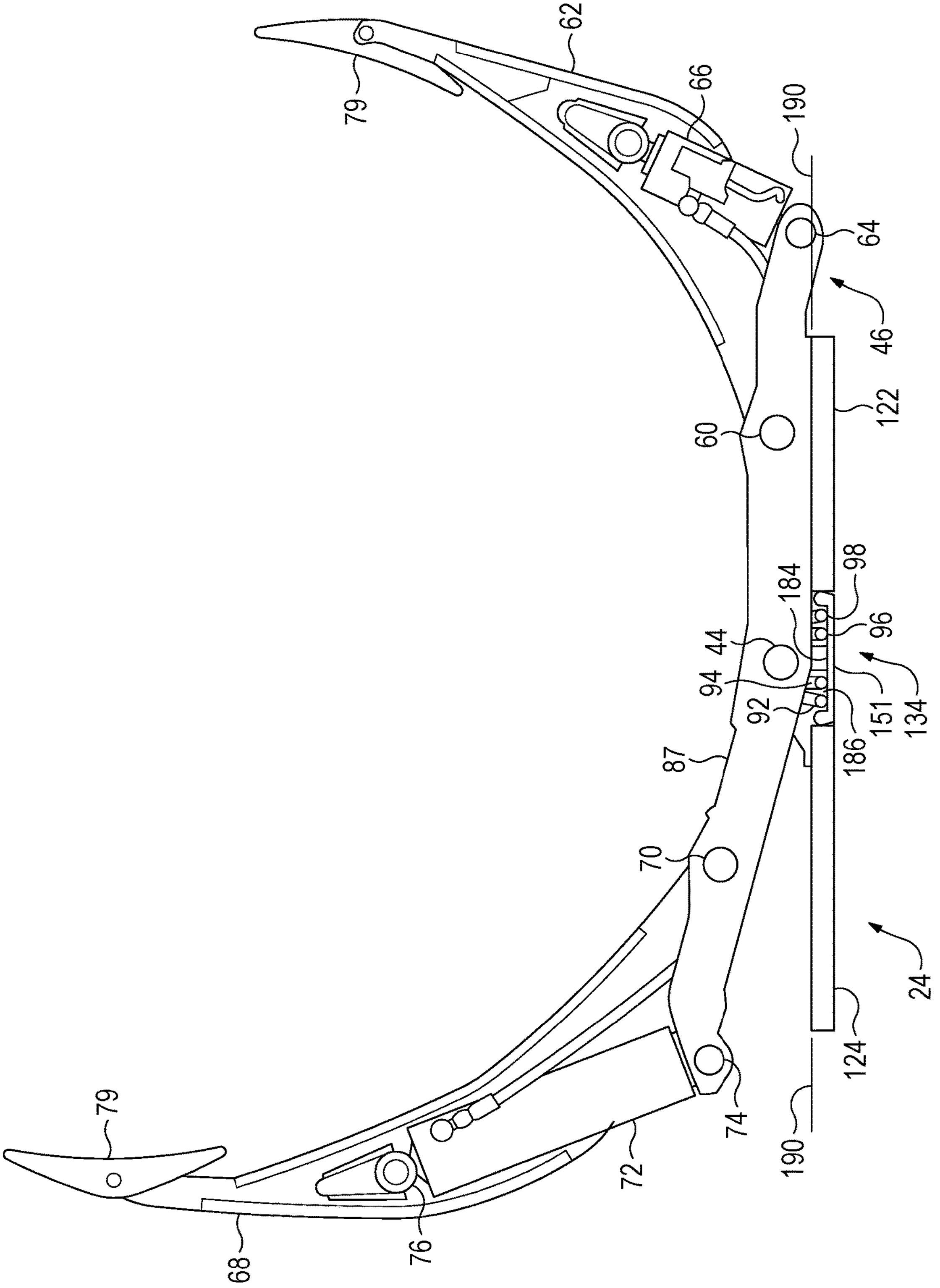
FIG. 3 shows a section view of the swing frame roll clamp of FIG. 2 taken along line A-A.

Referring also to FIGS. 2 and 3, pivotally attached to the clamp's faceplate 24 by respective pivot pins 44 is a pair of subframes 46, 48 each comprising a flange 86, 88 distal of the center of the face plate and a flange proximate the center of the face plate 87, 89, respectively. Extension or retraction of a hydraulic swing frame ram 50, pivotally connected to the faceplate 24 at one end by a pin 52 and pivotally connected to a swing arm bracket 54 at the second end by a second pin 56, pivots the subframes with respect to the faceplate 24 about an axis extending transverse to the clamp's axis of rotation 40. The swing ram bracket 54 is rigidly secured to the subframes 46, 48 by the pins 60 that pivotally secure the shorter clamp arm 62 to the subframes and by the pins 64 which secure the short arm clamping rams 66 to the subframe. The longer clamping arm(s) 68 is also pivotally connected to the subframes 46, 48 by pivot pins 70 and is pivoted relative to the subframes by plural hydraulic long arm clamping rams 72 which are connected to the subframes by pins 74 and to the long clamping arm by pins

76. Clamp pads 79, pivotally attached to the distal ends of the long clamping arm 68 and the short clamping arm 62, are arranged for engaging a roll 42 of paper or other material which is secured in the clamping attachment when the long arm clamping rams 72 and the short arm clamping rams 66 are extended, pivoting the clamping arms toward each other.

To enable cylindrical loads to be grasped while either resting in a horizontal or "bilge position," or alternatively resting next to a wall or other obstruction, swing frame roll clamp attachments such as is shown in FIGS. 1-3 are fashioned with a pair of opposed arms such that one arm is longer than another. Thus, for example, if a roll 42 is laying on a surface with the axis of the roll horizontal, it is preferable that the upper (long) arm(s) 68 of the roll clamp extend further forward of the lift vehicle than the lower (short) arm(s) 62 so that the upper arm can overreach the roll enabling the clamp pads 79 on the ends of the long and short clamping arms to engage the roll at diametrically opposed positions without having to push the lower arm under the roll. Similarly, when the roll rests vertically next to a wall, the long arm can also overreach the side of the roll not next to the wall, so as to enable the roll to be grasped at diametrically opposed positions without having to push the short arm between the roll and the wall.

On the other hand, when the roll is transported or stacked with its longitudinal axis vertical, it sometimes preferable that the arms on both sides of the roll extend equally far forward of the lift vehicle to facilitate inserting both arms between closely adjacent rolls without damaging them. In addition, it often useful to move the clamp or a roll transverse to the roll's longitudinal axis to align the clamp or roll without moving the lift vehicle during stacking or during loading or unloading a transport vehicle or to change the height of the roll slightly when placing a horizontally oriented roll in a machine. By extending or retracting the swing frame ram 50, the operator of the forklift truck can pivot the subframes 46, 48 about their central connections to the face plate 24 and move attached clamp arms 62, 68 between an unequal arm length position 80 and an equal arm length position 82 (in phantom).

Figure 4:
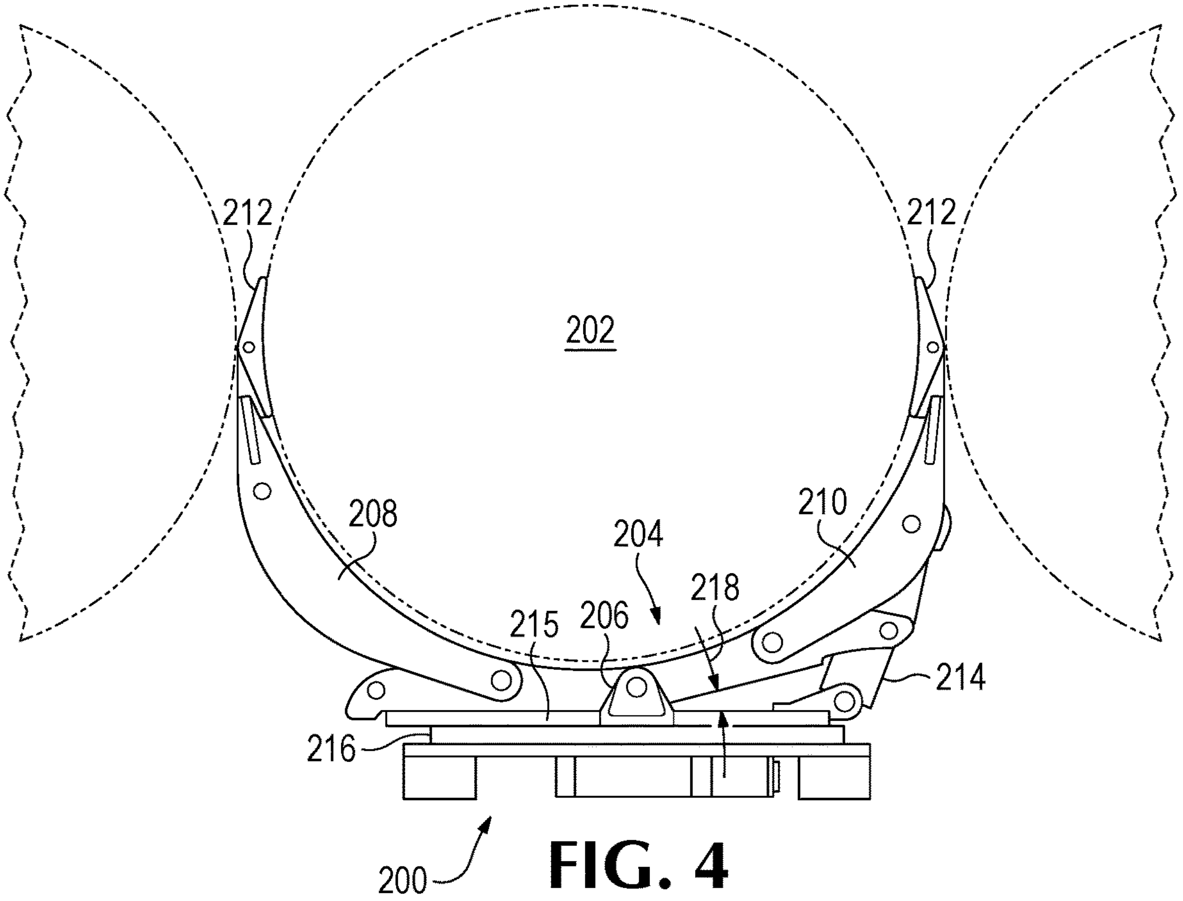
FIG. 4 Prior Art
FIG. 4 shows a prior art swing frame roll clamp with a rotator and a swing cylinder that is positioned so that the roll clamp is in an equal arm position.
Figure 5B:
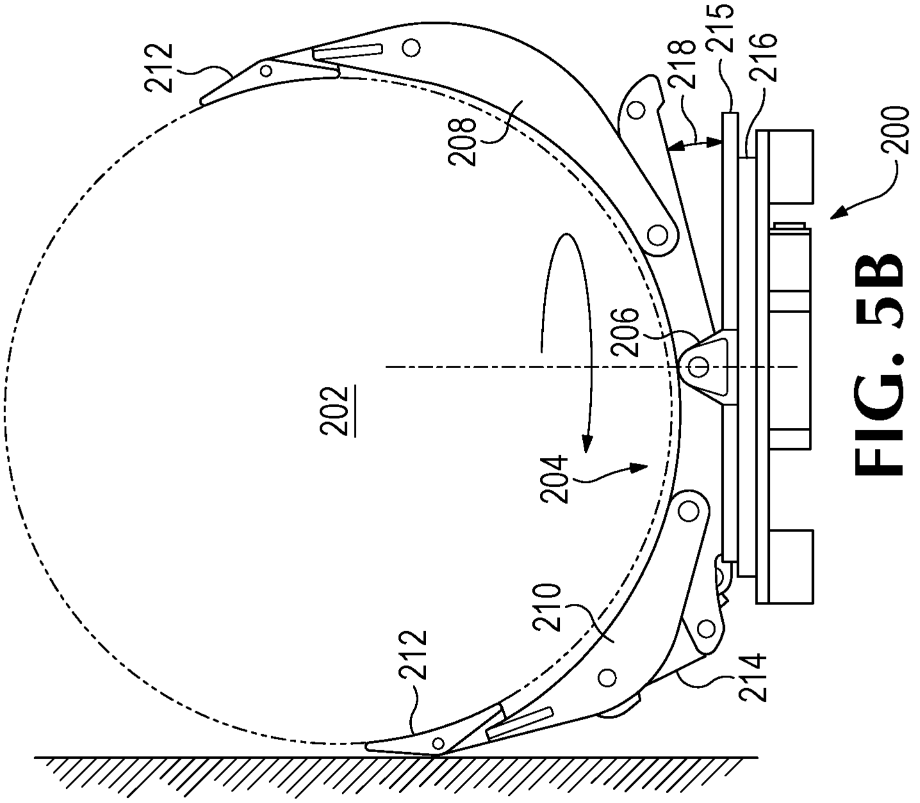
FIG. 5B Prior Art
FIG. 5B shows the roll clamp of FIG. 4 having the swing cylinder positioned so that the roll clamp is in a short/long arm position, rotated so that the short arm is to the right.
Figure 5A:
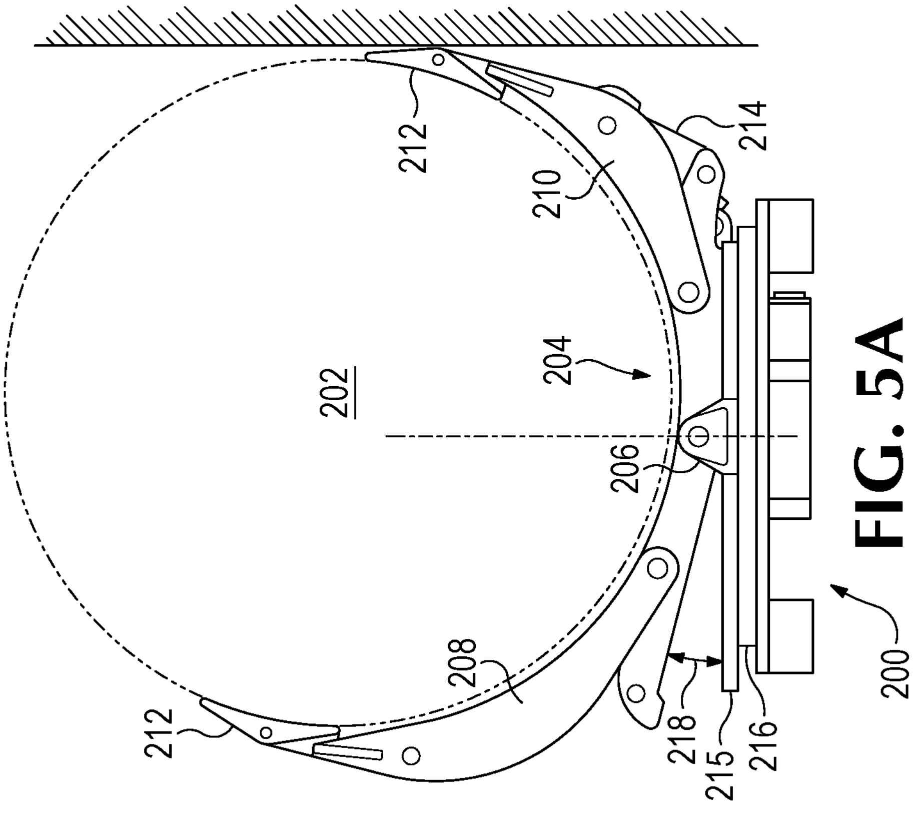
FIG. 5A Prior Art
FIG. 5A shows the roll clamp of FIG. 4 having the swing cylinder positioned so that the roll clamp is in a short/long arm position, rotated so that the short arm is to the right.

FIGS. 4, 5A, and 5B demonstrate this capability. Referring to FIG. 4, for example, a swing frame roll clamp attachment 200 for a lift truck may be used to grasp and move a cylindrical load 202 using clamp arm assembly 204 mounted pivotally to a bracket 206 on a mounting plate 215. The clamp arm assembly 204 may comprise a long arm 208 and a short arm 210, each arm terminating in a clamp pad 212 shaped to firmly grasp a cylindrical surface. A swing cylinder 214 is used to arrange the clamp arm assembly in either a long/short arm configuration relative to the load 202, or an equal arm configuration with respect to the load. In FIG. 4, for example, the swing cylinder 214 is extended so that side of the clamp arm assembly 204 proximate the short arm 210 is angled outwards relative to mounting plate 215 by swing angle 218. In this position of the swing cylinder 214, the swing frame roll clamp attachment 200 is in an equal arm configuration suitable to grasp a cylindrical resting vertically next to other cylindrical rolls, where overreaching is either not required, or is impractical to accomplish due to barriers on both sides of the load.

FIG. 5A, conversely, shows the swing frame roll clamp attachment 200 in a short/long arm configuration where the swing cylinder 214 is retracted so that side of the clamp arm assembly 204 adjacent the short arm 210 abuts the mounting plate 215, while the side of the clamp arm assembly 204 adjacent the long arm 208 is angled outwards relative the mounting plate 215 by the swing angle 220. In this short/ long arm configuration, the swing frame roll clamp attachment 200 may overreach a roll 202 so as to firmly grasp it, even though the roll 202 is adjacent a wall or other obstruction. FIG. 5B similarly shows the swing frame attachment in a short/long arm configuration, but rotator 216 positions the short arm 210 to the left of the long arm 208.

The swing frame roll clamp attachment 200 shown in FIGS. 4, 5A, and 5B accordingly facilitates the grasping of cylindrical loads such as rolls, regardless of prospective obstacles such as walls, floors, adjacent rolls, etc., while providing for direct insertion or extraction of the clamp. Direct insertion/extraction occurs when the vehicle the clamp is mounted on does not have to turn at an angle to deposit the load, or back out after depositing the load. It achieves this flexibility by alternating between an equal arm configuration and a short/long arm configuration; the former is achieved by positioning (swinging) the clamp fully to the long arm side, while the latter is achieved by positioning (swinging) the clamp fully to the short arm side.

In many cases a lift truck operator can anticipate which side of the clamp the short arm must occupy and preemptively orient the clamp for optimal clamp placement and subsequent load deposition/extraction. In cases where proper clamp orientation cannot be anticipated, the proper orientation will need to be determined upon arrival at the destination, and frequently in such cases where the current orientation is opposite of what is needed, the clamp will require 180-degree rotation. Cases where clamp orientation cannot be anticipated will include traditional cases where a human being is directly operating the lift truck or cases where an automated lift truck is utilized in the process. Often, however, there is not sufficient spatial maneuverability next to the load to allow rotation of the clamp arms to the desired position, which means that the lift truck will need to be moved to an area with sufficient space, rotate the clamp arms 180-degrees about an axis perpendicular to that through which the clamp arms swing, and approach the load again in the desired position.

Disclosed is an improved swing frame roll clamp that eliminates the need to rotate the clamp arms when a load is approached with the short arm in the wrong orientation. In some embodiments this feature also allows elimination of the rotator, which significantly reduces the weight of the attachment. In some embodiments, the pivot point of the swing arm assembly may be moved further away from the mounting plate than exists in current swing frame roll clamps. In such embodiments, the improved swing frame roll clamp allows handling of loads having greater diameters than can be precisely positioned with existing swing frame roll clamps.

Figure 6:
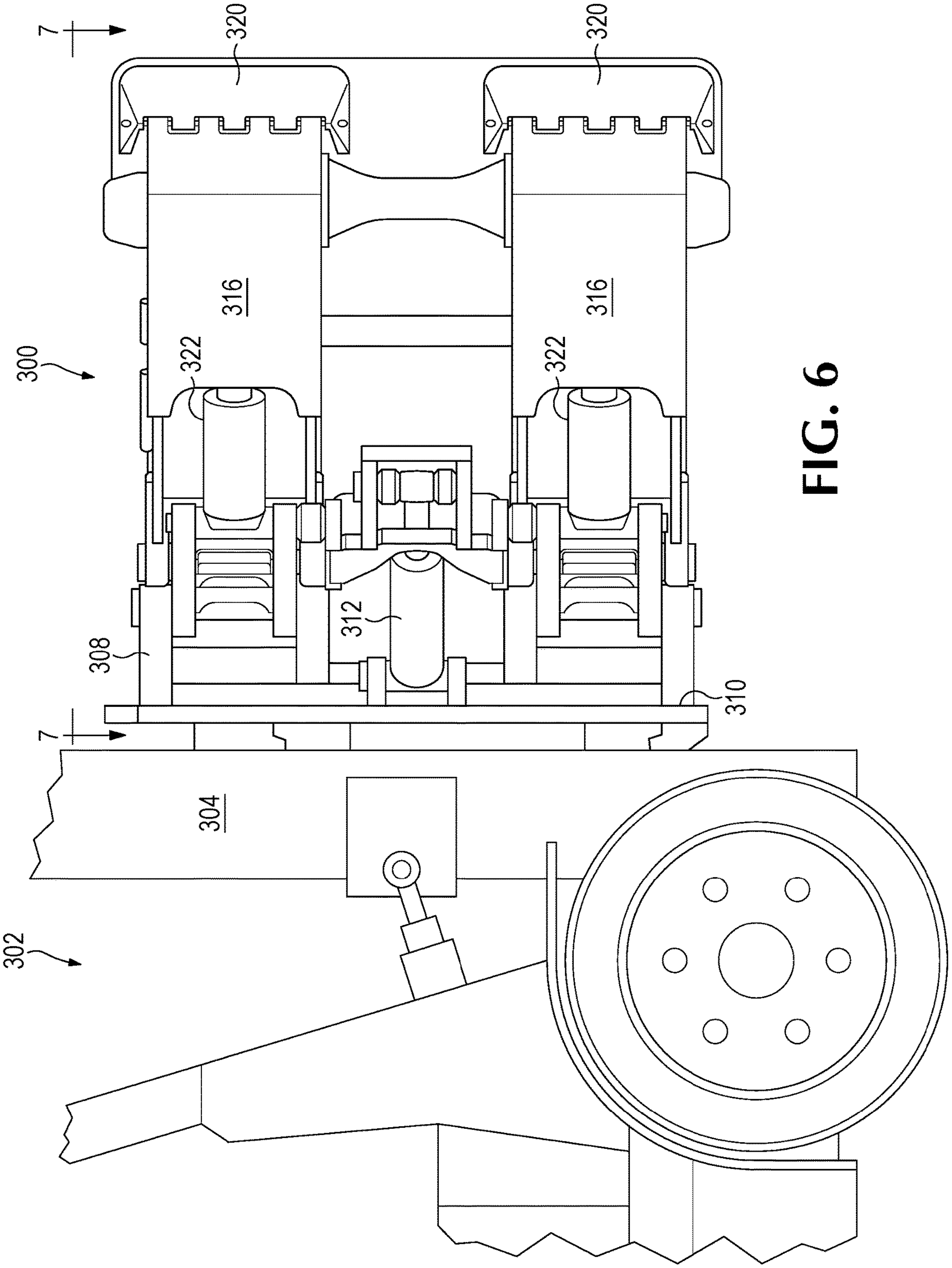
FIG. 6 shows a side view of an improved swing roll clamp as described herein.
Figure 7:
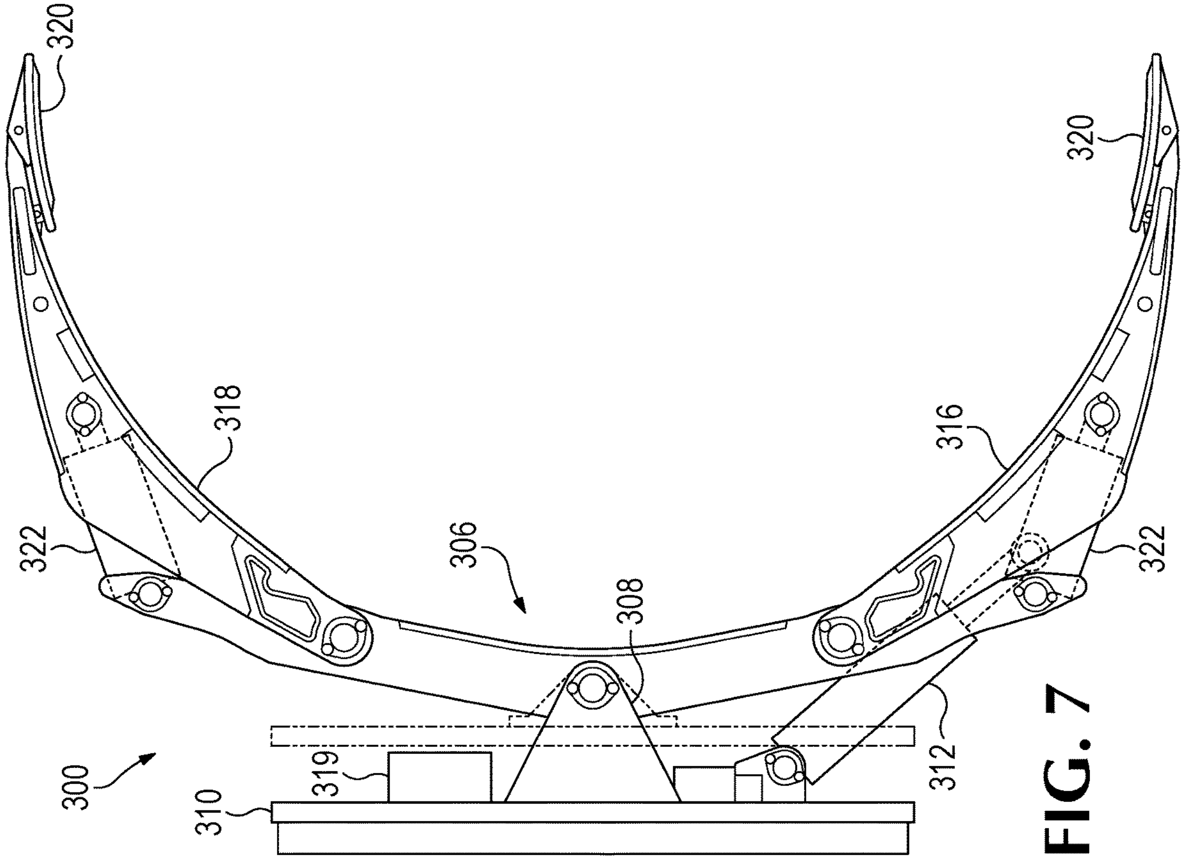
FIG. 7 shows a top view of the swing roll clamp of FIG. 6 in an equal arm configuration.

Specifically, FIGS. 6 and 7 show an improved swing frame roll clamp 300 that may be selectively attached to a lift truck 302 having a mast 304 used to raise, carry, and lower loads grasped by the roll clamp 300. The roll clamp 300 preferably includes a clamp arm assembly 306 mounted pivotally to a bracket 308, which is in turn fixedly secured to a mounting plate 310 by which the roll clamp 300 may be attached to a lift truck 302. The clamp arm assembly 306 preferably does not include a short arm and a long arm; rather, the clamp arm assembly 306 includes opposed arms 316 and 318 of equal length, each arm having a clamp pad 320 attached at its terminal end and each arm operated between an opening and closing movement via clamp cylinders 322. The clamp arms 316, 318 are configured to swing about a swing axis through the pivot point of bracket 308.

Unlike the swing frame roll clamp attachment 200 of FIG. 4, the swing frame roll clamp attachment 300 is therefore in an equal arm configuration in the neutral position where the angle of the clamp arms relative the mounting plate 310 is the same. Conversely, a short/long arm configuration is achieved by either fully retracting swing actuator 312 from that neutral position, in which case the arm 316 becomes a short arm and the arm 318 becomes a long arm, or extending the swing actuator 312 from that neutral position until the arm 318 contacts member 319, in which case the arm 316 becomes the long arm and the arm 318 becomes the short arm. Stated differently, instead of the arms being long and short when swung fully to one side, and equal when swung fully to the other, the arms are designed to be equal arm when facing forward. With this design, the long and short configuration is accessible when swung fully to either side, and operation of the swing actuator 312 determines which arm is the short arm, and which arm is the long arm. This design eliminates the need for a rotator in applications where rolls are not intended to be raised from, carried in, or lowered to, a bilge position. In some embodiments, however, a rotator may be included if it is desired to grasp, carry, or deposit loads in a bilge position. Those of ordinary skill in the art will appreciate that the swing actuator 312 may typically comprise a hydraulic cylinder, but will also appreciate that other actuators may also be used, e.g., electric actuators.

Figure 8:
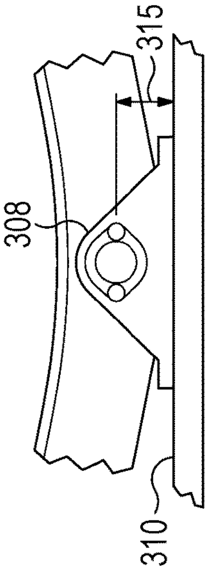
FIGS. 8 and 9 show the effect on the swing angle of a swing frame roll clamp of moving the pivot axis of the arms outwards.
Figure 9:
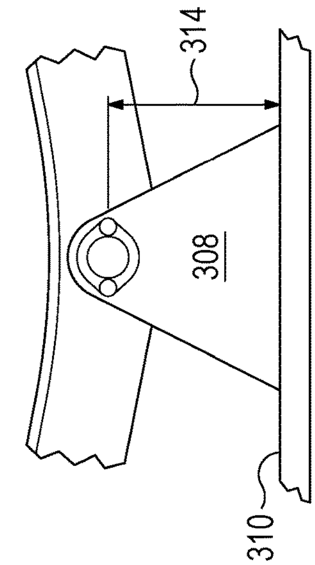
Figure 10:
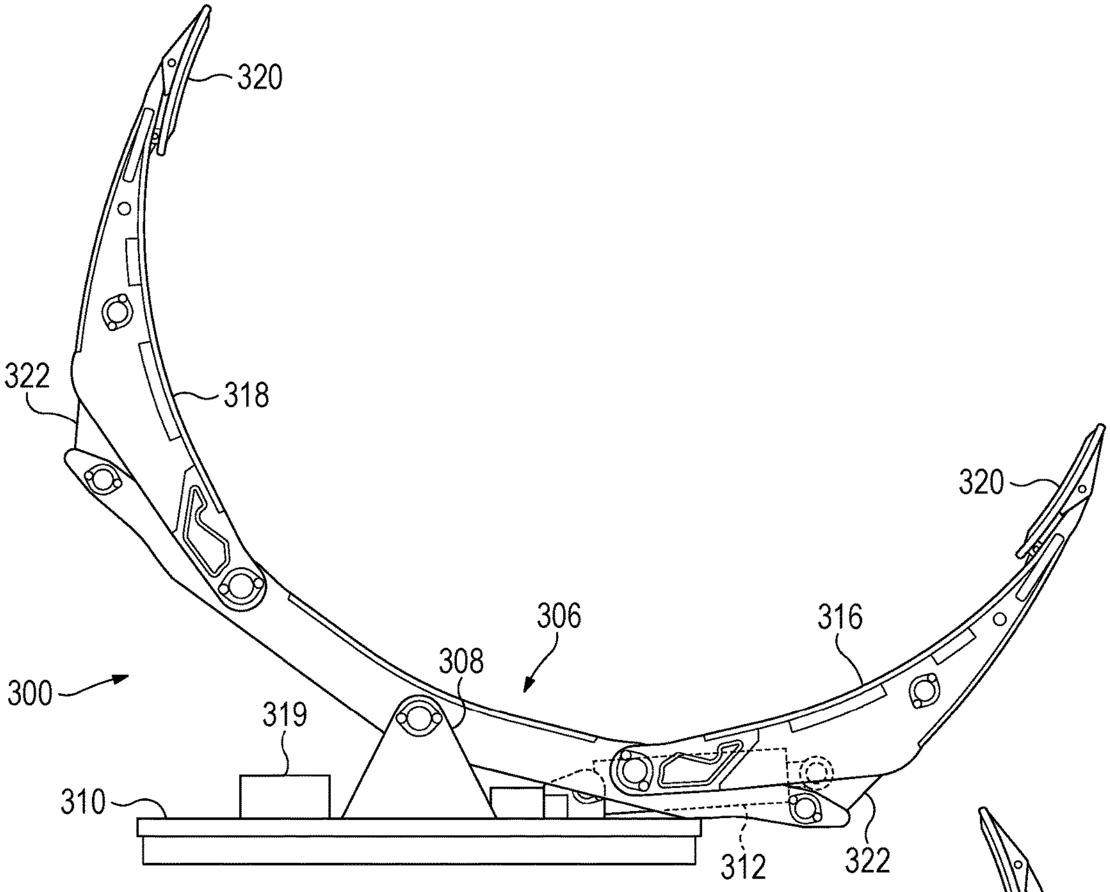
FIG. 10 shows the position of the swing axis of the swing roll clamp of FIG. 6.
Figure 11:
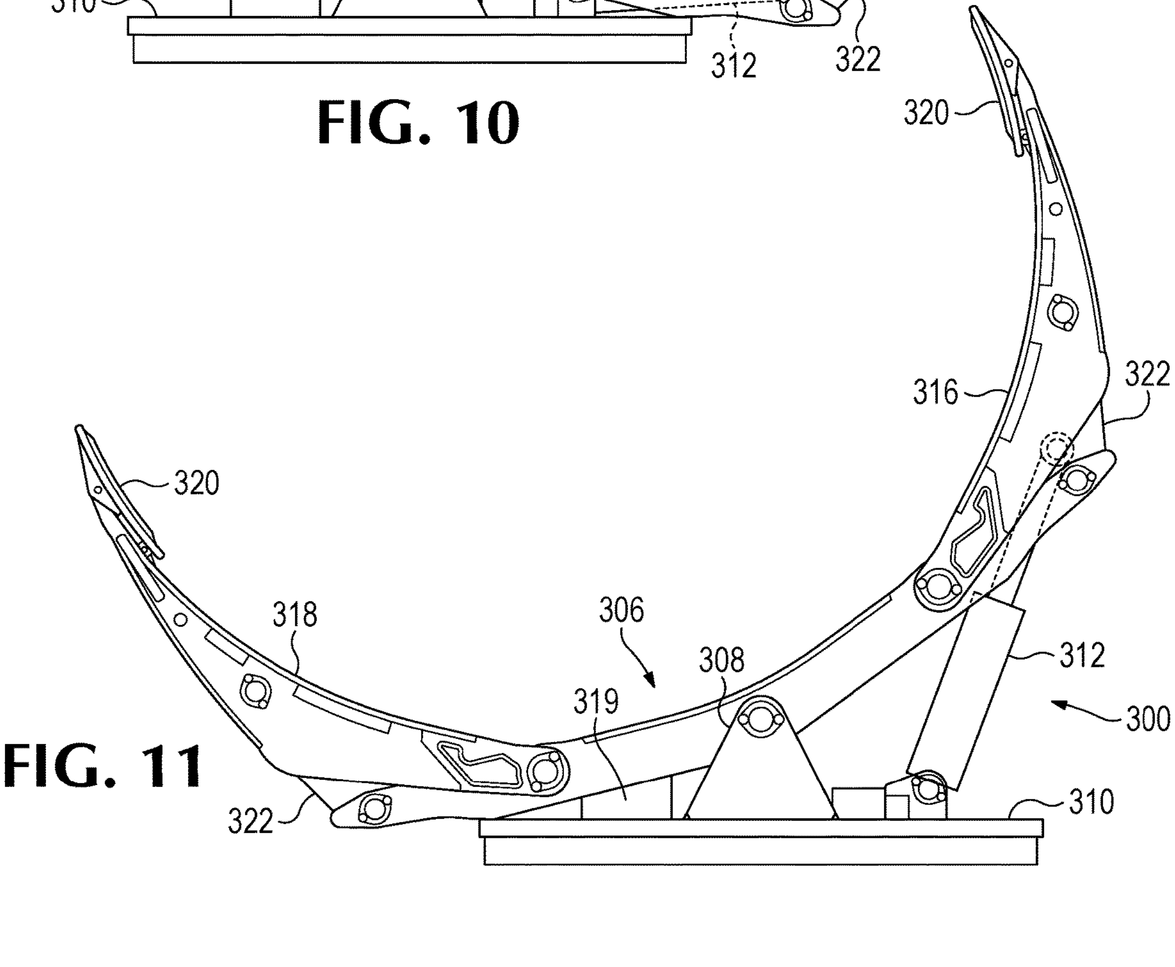
FIG. 11 shows a top view of the swing roll clamp of FIG. 6 in a short/long arm configuration with the short arm to the left.

Further, the swing frame roll clamp may in some embodiments position the pivot point of the swing arm assembly further away from the mounting plate than exists in current swing frame roll clamps. With the equal arm orientation in a neutral position of the swing cylinder 312, as described above, the effective 'swing angle' is cut in half; half of the angle is used when swinging to the right, and half when swinging to the left. In order to achieve the same long and short arm configuration as prior art swing frame roll clamps, the swing angle must increase. To achieve this increased swing angle, the pivot point of the swing frame roll clamp attachment is moved forward. This increases the range of available swinging by moving the pivot further away from the mounting plate. This can be seen by comparing FIGS. 8 and 9. In FIG. 8, with the pivot axis relatively close to the mounting plate, the distance 315 is small and does not allow a large angular deflection of the clamp arms. In FIG. 9, however, the pivot axis is moved further away from the mounting plate and the distance 314 permits a much greater deflection. FIGS. 10 and 11 show that the effect of moving the pivot axis defined by the flange 308 outwards is to greatly increase the swing angle of the clamp arms 316 and 318.

In other embodiments, however, the swing angle of the clamp attachment 300 may be increased by including two swing cylinders 312, one attached to each of the arms 316 and 318, where the arms 316, 318 are coordinated by hydraulically connecting the head side of one swing cylinder to the rod side of the other swing cylinder. With this design, when pressure is supplied to the swing cylinders, one is pushing while the other is pulling.

Figure 12:
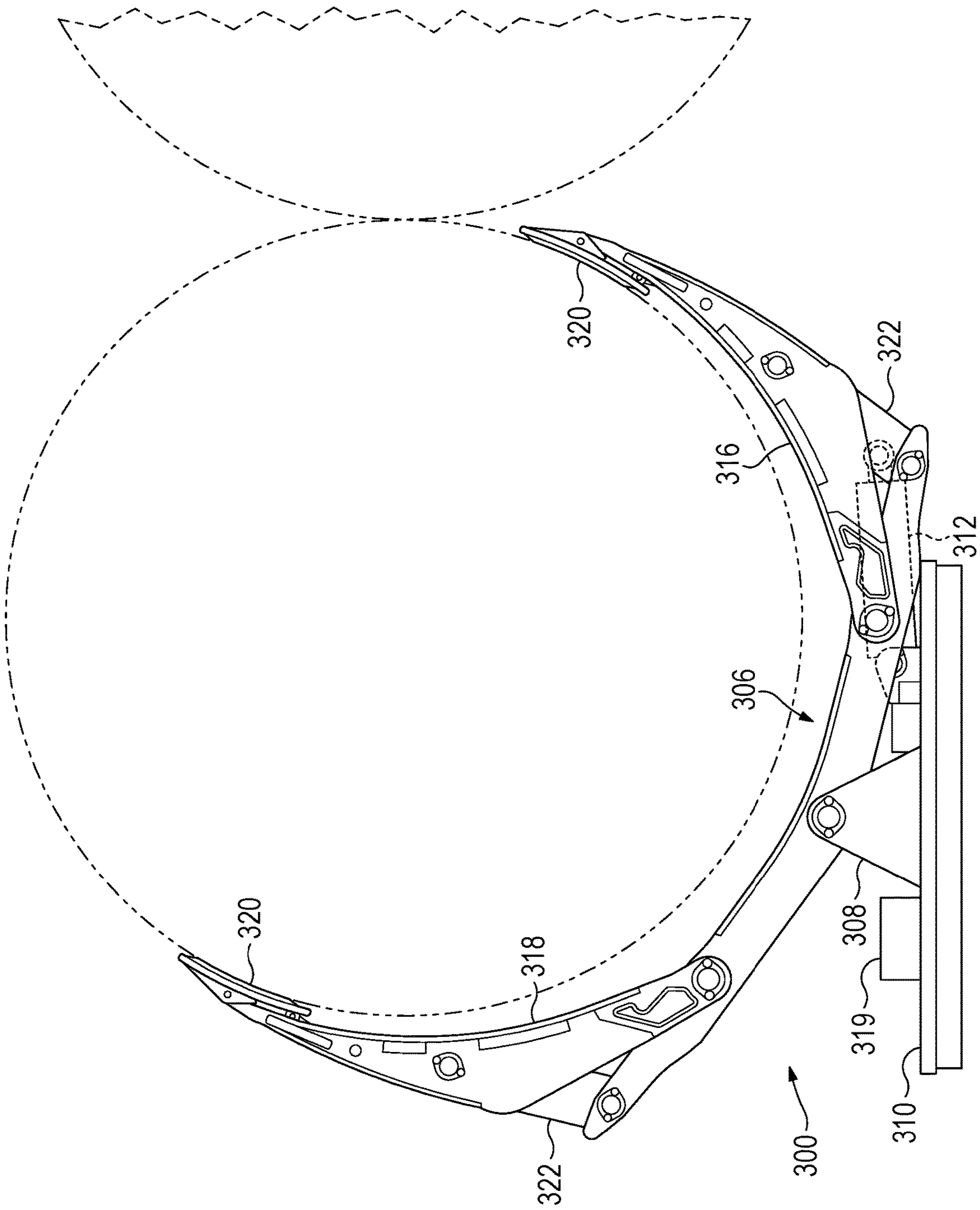
FIG. 12 shows a top view of the swing roll clamp of FIG. 6 in a short/long arm configuration with the short arm to the right.

As described above, the improved swing frame clamp attachment 300 eliminates the need for rotation/reorienting of the clamp and the load to accommodate barriers adjacent the load to be grasped/deposited. In turn, eliminating the need for rotation allows the weight of the attachment to be reduced by eliminating the rotator, which is one of the heavier components of a swing frame roll clamp. Eliminating rotation also reduces time-per-operation. Moving the swing pivot forward increases the available swing angle of the disclosed swing frame roll clamp attachments. Such a design also allows the clamp to place a larger diameter range of rolls directly against walls or boundaries with a direct insertion/extraction method. For example, the swing frame roll clamp 300 as disclosed in FIGS. 6-11 may place a roll directly against a wall or against another roll, as shown in FIG. 12. The swing frame roll clamp 200 shown in FIGS. 4, 5A, and 5B, however, when depositing or grasping the same diameter roll, however, must have a 41 mm gap between the roll and the boundary.

It will be appreciated that the inventions claimed herein are not restricted to the particular embodiments that have been described, and that variations may be made without departing from the scope of the invention as defined in the appended claims, as interpreted in accordance with principles of prevailing law, including the doctrine of equivalents or any other principle that enlarges the enforceable scope of a claim beyond its literal scope. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein. In the event of inconsistent usages between this document and those documents so incorporated by reference, the usage in the incorporated reference(s) should be considered supplementary to that of this document; for irreconcilable inconsistencies, the usage in this document controls. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A swing frame roll clamp comprising a mounting plate mountable to a lift truck and a pair of opposed clamp arms configured to selectively and alternately grasp and release a cylindrical load, each opposed clamp arm movable toward the other clamp arm, and each opposed clamp arm capable of becoming either a short arm or a long arm relative to the other opposed clamp arm.

2. The swing frame roll clamp attachment of claim 1 where each opposed clamp arm is either a short arm or long arm based on operation of a swing actuator between a fully retracted position and a fully extended position.

3. The swing frame roll clamp of claim 2 where at least one of the fully extended position and fully retracted position is defined by contact between a respective clamp arm and a stop member.

4. The swing frame roll clamp of claim 2 capable of being configured in an equal arm configuration associated with the swing actuator being in a position between the fully extended position and the fully retracted position.

5. The swing frame roll clamp of claim 1 that swings around a swing axis, and free from including a rotator that rotates the clamp arms about an axis perpendicular to the swing axis.

6. A swing frame roll clamp comprising a mounting plate mountable to a lift truck and a pair of opposed clamp arms configured to selectively and alternately grasp and release a cylindrical load, each opposed clamp arm movable toward the other clamp arm, the opposed clamp arms configured to swing relative to the mounting plate via operation of a swing actuator between a fully retracted position and a fully extended position, each of the fully retracted position and the fully extended position configuring the swing frame roll clamp in a short/long arm configuration.

7. The swing frame roll clamp of claim 6 where at least one of the fully extended position and fully retracted position is defined by contact between a respective clamp arm and a stop member.

8. The swing frame roll clamp of claim 6 capable of being configured in an equal arm configuration associated with the swing actuator being in a position between the fully extended position and the fully retracted position.

9. The swing frame roll clamp of claim 6 that swings around a swing axis, and free from including a rotator that rotates the clamp arms about an axis perpendicular to the swing axis.

10. A swing frame roll clamp attachment comprising a mounting plate mountable to a lift truck and a pair of opposed clamp arms swingable about a first axis and configured to selectively and alternately grasp and release a cylindrical load, each opposed clamp arm movable toward the other clamp arm, the roll clamp attachment configurable to have a short arm on either side of the first axis, and in a manner free from rotating the short arm about an axis perpendicular to the first axis.

11. The swing frame roll clamp of claim 10 where each opposed clamp arm is capable of becoming either a short arm or a long arm relative to the other opposed clamp arm.

12. The swing frame roll clamp attachment of claim 11 where each opposed clamp arm is either a short arm or long arm based on operation of a swing actuator between a fully retracted position and a fully extended position.

13. The swing frame roll clamp of claim 12 where at least one of the fully extended position and fully retracted position is defined by contact between a respective clamp arm and a stop member.

14. The swing frame roll clamp of claim 12 capable of being configured in an equal arm configuration associated with the swing actuator being in a position between the fully extended position and the fully retracted position.

15. The swing frame roll clamp of claim 10 free from including a rotator that rotates the clamp arms about the axis perpendicular to the first axis.

* * * * *